(12) United States Patent
Patel et al.

(10) Patent No.: US 7,624,941 B1
(45) Date of Patent: Dec. 1, 2009

(54) METHOD OF CONTROLLING AIRCRAFT, MISSILES, MUNITIONS AND GROUND VEHICLES WITH PLASMA ACTUATORS

(75) Inventors: Mehul Patel, Chandler, AZ (US); Tom Corke, Granger, IN (US)

(73) Assignees: Orbital Research Inc., Cleveland, OH (US); University of Notre Dame du Lac, Notre Dame, IN (US)

( * ) Notice: Subject to any disclaimer, the term of this patent is extended or adjusted under 35 U.S.C. 154(b) by 759 days.

(21) Appl. No.: 11/415,535

(22) Filed: May 2, 2006

(51) Int. Cl.
*F41G 7/00* (2006.01)
(52) U.S. Cl. .................... 244/3.22; 244/205; 244/200.1
(58) Field of Classification Search ................ 244/3.21, 244/3.22, 3.1, 205, 204.1, 200.1, 200
See application file for complete search history.

(56) References Cited

U.S. PATENT DOCUMENTS

| | | | | |
|---|---|---|---|---|
| 5,631,830 | A | * | 5/1997 | Schroeder ...................... 701/4 |
| 7,380,756 | B1 | * | 6/2008 | Enloe et al. .................. 244/175 |
| 2006/0131282 | A1 | * | 6/2006 | Miller et al. ............. 219/121.5 |

OTHER PUBLICATIONS

AIAA-2004-2127-734.*
AIAA-2001-2975-742.*
AIAA-3884-214.*
AIAA-2005-563-565.*
AIAA-2006-1207-656.*
AIAA-2006-1208-801.*
AIAA-2003-211-632.*
AIAA-2004-841-706.*
SiltonMassey reference.*

Thomas C. Corke and Chuan He, "Plasma Flaps and Salts: An Application of Weakly-Ionized Plasma Actuators," AIAA Paper 2004-2127, 2004, USA.

M. Amitay, M. Horvath, M. Michaux, and A. Glezer, "Virtual Aerodynamic Shape Modification at Low Angles of Attack using Synthetic Jet Actuators," AIAA Paper 2001-2975, 2001.

C.L. Enloe, et al., "Mechanisms and Responses of a Single Dielectric Barrier Plasma Actuator: Geometric Effects," Mar. 2004, AIAA Journal, vol. 42, No. 3, USA.

Thomas C. Corke and Martiqua L. Post, "Overview of Plasma Flow Control: Concepts, Optimization, and Applications," AIAA Paper 2005-0563, 2005, USA.

Mehul P. Patel, Zak H. Sowle, Thomas C. Corke, and Chuan He, "Autonomous Sensing and Control of Wing Stall Using a Smart Plasma Slat," AIAA Paper 2006-1207, 2006, USA.

(Continued)

*Primary Examiner*—Timothy D Collins
(74) *Attorney, Agent, or Firm*—Brian M. Kolkowski

(57) ABSTRACT

The present invention relates to a method of controlling an aircraft, missile, munition or ground vehicle with plasma actuators, and more particularly to controlling fluid flow across their surfaces or other surfaces, which would benefit from such a method. The method includes the design of an aerodynamic plasma actuator for the purpose of controlling airflow separation over a control surface of a aircraft, missile, or a ground vehicle, and more particularly to the method of determining a modulation frequency for the plasma actuator for the purpose of fluid flow control over these vehicles. The various embodiments provide the steps to increase the efficiency of aircraft, missiles, munitions and ground vehicles. The method of flow control provides a means for reducing aircraft, missile's, munition's and ground vehicle's power requirements. These methods also provide alternate means for aerodynamic control using low-power hingeless plasma actuator devices.

20 Claims, 8 Drawing Sheets

OTHER PUBLICATIONS

Thomas C. Corke, Benjamin Mertz, and Mehul P. Patel, "Plasma Flow Control Optimized Airfoil," AIAA Paper 2006-1208, 2006, USA.

Michael Kerho and Brian Kramer, "Enhanced Airfoil Design Incorporating Boundary Layer Mixing Devices," AIAA Paper 2003-0211, 2003, USA.

Martiqua L. Post and Thomas C. Corke, "Separation Control Using Plasma Actuators—Stationary and Oscillating Airfoils," AIAA Paper 2004-0841, 2004, USA.

Sandra I. Silton, Kevin C. Massey, "Integrated Numerical and Experimental Investigation of Actuator Performance for Guidance of Supersonic Projectiles," USA.

* cited by examiner

METHOD OF CONTROLLING AIRCRAFT, MISSILES, MUNITIONS AND GROUND VEHICLES WITH PLASMA ACTUATORS

The U.S. Government has a paid-up license in this invention and the right in limited circumstances to require the patent owner to license others on reasonable terms provided for by the terms of grants F33615-03-M-3327 and FA8650-04-C-3405 awarded by the U.S. Air Force, AFRL, Air Vehicles Directorate, Wright-Patterson Air Force Base.

BACKGROUND OF THE INVENTION

1. Field of the Invention

The present invention relates to a method of controlling an aircraft, missile, munition or ground vehicle with plasma actuators, and more particularly to controlling fluid flow across their surfaces or other surfaces, which would benefit from such a method. The method includes the design of an aerodynamic plasma actuator for the purpose of controlling airflow separation over a control surface of a aircraft, missile, or a ground vehicle, and more particularly to the method of determining a modulation frequency for the plasma actuator for the purpose of fluid flow control over these vehicles.

2. Technical Background

Traditionally aircraft, missiles, munitions or ground vehicles use conventional control surfaces to control or assist in controlling aerodynamic stability and/or maneuverability during operation. For example, high-lift systems play an important role in the design of air vehicles. The wings on most modern-day air vehicles are equipped with high-lift systems, generally in the form of leading-edge slats and trailing-edge flaps. These devices have been shown to enhance the aerodynamic performance of air vehicles through improvements in the coefficient of lift, lift to drag ratio, and stall-angle. Advantages of such performance-enhancing devices include improvements in maneuverability, turn rates, glide range and payload, and reductions in takeoff/landing distance and field length requirements. Another example of traditional control surfaces is the use of front and rear spoilers, inlets, wings and other control surfaces on ground vehicles.

While the benefits of these conventional types of control surfaces are well documented, it is also known that the use of movable control surfaces increase airframe noise and vibration, particularly at high deflection angles. With these types of surfaces, most of the noise originates from the separated flow in the gap or hinge regions which contribute to the drag component of the viscous drag on the control surface. At off design conditions, the drag penalty from these traditional control surfaces is very high. For example by some estimates used in wing and tail design, eliminating the hinge gaps would result in a 10% drag decrease. In addition, for military applications, the hinge gap is a source of radar wave reflection resulting in a more detectable radar image. Another drawback with traditional control surfaces is that motors or pneumatics are required, which add volume, weight, and costs to these types of systems.

In view of the foregoing disadvantages of presently available control surfaces, it is desirable to develop methods and flow control systems for missile's, aircraft, munitions and ground vehicles which overcome these limitations. Further it is desirable to develop methods and flow control systems that are hingeless and retain/improve the aerodynamic effects without compromising lift performance.

SUMMARY OF THE INVENTION

The present invention relates to a method of controlling an aircraft, missile, munition or ground vehicle with plasma actuators, and more particularly to controlling fluid flow across their surfaces or other surfaces, which would benefit from such a method. The method includes the design of an aerodynamic plasma actuator for the purpose of controlling airflow separation over a control surface of a aircraft, missile, or a ground vehicle, and more particularly to the method of determining a modulation frequency for the plasma actuator for the purpose of fluid flow control over these vehicles.

The various embodiments of the method of the present invention provide the steps to increase the efficiency of aircraft, missiles, munitions and ground vehicles. The method of flow control provides a means for reducing aircraft, missile's, munition's and ground vehicle's power requirements. These methods provide alternate means for aerodynamic control using low-power hingeless plasma actuator devices.

In one embodiment, the present invention includes a method of controlling flow of fluid across a surface of a missile, aircraft, munition, or ground vehicle having a number of surfaces comprising the steps of locating a plasma actuator on or essentially flush with a surface of the missile, aircraft, munition or ground vehicle having a trailing edge or aft end, a placement distance from the trailing edge or aft end; measuring or estimating a velocity of a fluid flowing past the surface of the missile, aircraft, munition or ground vehicle; and activating the plasma actuator at a frequency equal to between about 0.6 to about 1.4 times the velocity of the fluid divided by the placement distance of the plasma actuator from the trailing edge or aft end or the extent of flow separation.

In another embodiment, the present invention includes a method of controlling flow of fluid across a surface of a missile, aircraft, munition, or ground vehicle having a number of surfaces comprising the steps of locating a plasma actuator on or essentially flush with a surface of the missile, aircraft, munition or ground vehicle having a trailing edge or aft end, a placement distance from the trailing edge or aft end; measuring or estimating a velocity of a fluid flowing past the surface of the missile, aircraft, munition or ground vehicle; determining or estimating a time of flow separation of the fluid from the surface near the location of the plasma actuator; and activating the plasma actuator near the time of flow separation of the fluid at a frequency equal to between about 0.6 to about 1.4 times the velocity of the fluid divided by the placement distance of the plasma actuator from the trailing edge or aft end or the extent of flow separation.

In still another embodiment, the present invention includes a method of controlling flow of fluid across a surface of a missile, aircraft, munition, or ground vehicle having a number of surfaces comprising the steps of locating a plasma actuator on or essentially flush with a surface of the missile, aircraft, munition or ground vehicle having a trailing edge or aft end, a placement distance from the trailing edge or aft end; locating a sensor having a signal, the sensor being positioned to detect or predict flow separation of a fluid near the location of the plasma actuator; measuring or estimating a velocity of a fluid flowing past the surface of the missile, aircraft, munition or ground vehicle; determining or estimating a time of the flow separation of the fluid from the surface near the location of the plasma actuator based at least in part on the signal of the sensor; and activating and deactivating the plasma actuator near the time of flow separation of the fluid at a frequency equal to between about 0.6 to about 1.4 times the velocity of the fluid divided by the placement distance of the plasma actuator from the trailing edge or aft end or the extent of flow separation.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENT

Figure 1:
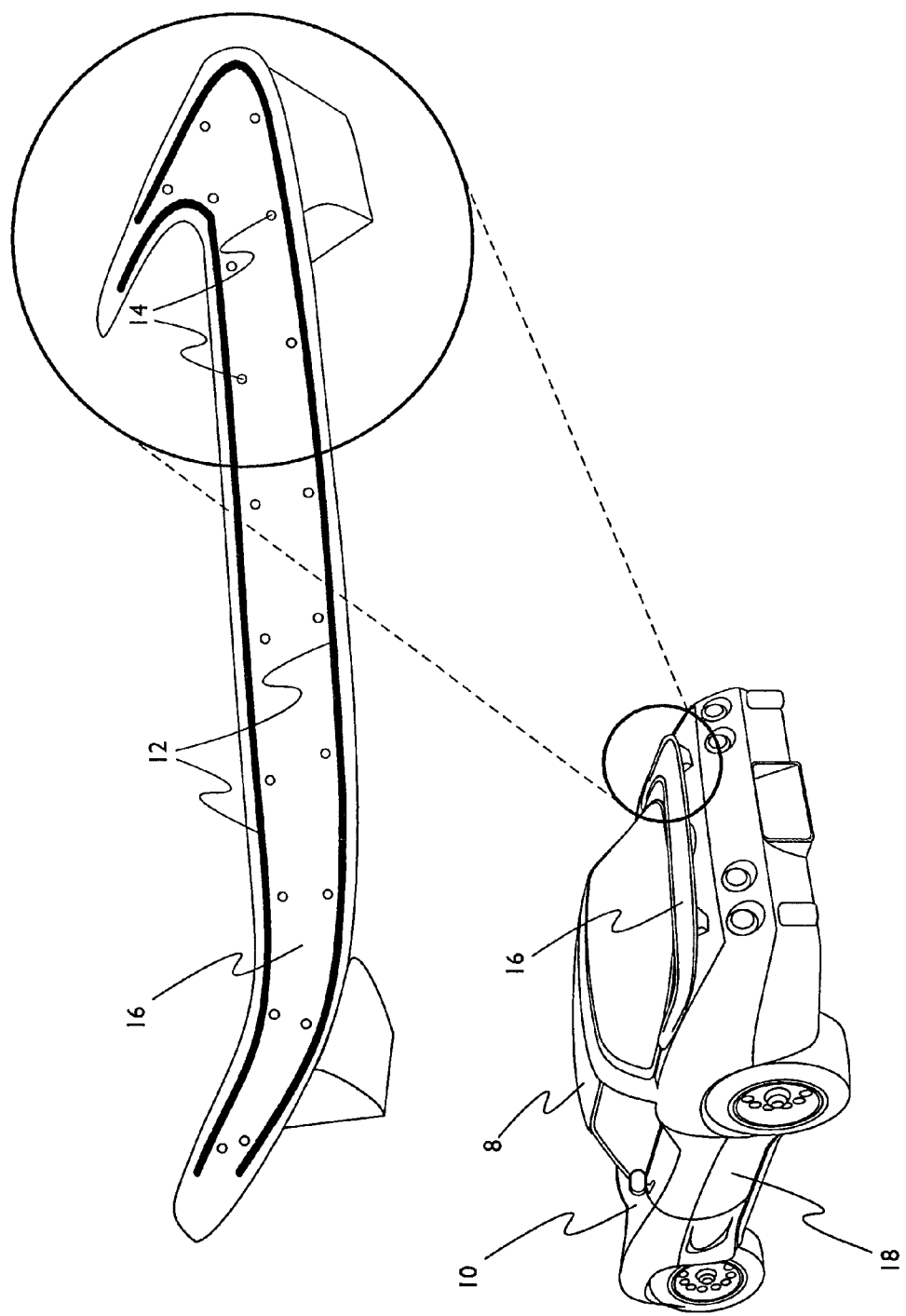
FIG. 1. Schematic view of a ground vehicle depicting placement or location of one or more plasma actuator(s).

The present invention relates to a method of controlling an aircraft, missile, munition or ground vehicle with plasma actuators, and more particularly to controlling fluid flow across their surfaces or other surfaces, which would benefit from such a method. The method includes the design of an aerodynamic plasma actuator for the purpose of controlling airflow separation over a control surface of a aircraft, missile, or a ground vehicle, and more particularly to the method of determining a modulation frequency for the plasma actuator for the purpose of fluid flow control over these vehicles.

The method involves a number a number of steps. Depending on particular embodiments of the method, the method could include one or more of the following steps, but is not limited to only these steps. Possible steps are: locating or placing a plasma actuator; measuring or estimating the free stream velocity of fluid flowing past the surface on which the plasma actuator is located; locating or placing a sensor at or near the plasma actuator; determining or estimating in real-time or from tests or models when and where flow separation is likely to occur on the surface; activating and deactivating the plasma actuator to obtain optimal performance.

In locating a plasma actuator, the plasma actuator, preferably, is a dielectric-barrier-discharge plasma actuator. The dielectric-barrier-discharge or surface discharge plasma actuator preferably consists of two electrodes that are separated by a layer of dielectric material. One of the electrodes is preferably exposed to the surrounding air and the other either partially or fully encapsulated by the dielectric material during application. The electrodes are preferably made with good conductors such as copper, gold, silver and other forms of films, foils and plates. The dielectric material, preferably is made from material(s) exhibiting good dielectric properties, which can withstand the electric field gradient and the localized materials heating of the plasma actuator resulting from the process of ionizing the air or fluids surrounding an aircraft, missile, munition or ground vehicle. Dielectric materials include but are not limited to fiberglass, Teflon, Kapton, and the like. More preferably the dielectric material used is Kapton film having a breakdown voltage of approximately 7 kV per $10^{-3}$ inch thickness and a dielectric constant of 3.3.

Preferably, the plasma actuator is an off-centered laminate formed with one conductor electrode being joined to the upper surface of the dielectric material and the other conductor electrode being joined to the lower surface of the dielectric material. Still preferably, the electrodes are arranged in an asymmetric arrangement such that there is little or no overlap in order to ensure uniform plasma in the spanwise direction of the plasma actuator. The center of this overlap or junction of the plasma actuator (with no overlap) is the point from which the plasma actuator's placement distance from the trailing edge or aft end of a control surface. Preferably, the overlap is less than about 15 cm, more preferably less than about 7.5 cm, and most preferably less than about 2 cm.

The plasma actuator can be located on any surface of a missile, aircraft, munition or ground vehicle. Preferably, the plasma actuator is located on the surface where it can function for a given purpose or to increase performance. The plasma actuators can be used to eliminate/promote flow separation to affect lift, drag, and control pitch, roll, and yaw moments around the control surface depending on how they are placed and operated. The placement distance of the plasma actuator is measured from the center of the overlap or junction of the electrodes of the actuator to the trailing edge or aft end of the surface. The placement generally is measured in meters.

The plasma actuator can be attached to the surface or preferably mounted essentially flush to the surface. The plasma actuator can be produced by various laminating technologies or other techniques know to those skilled in the art. These technologies can be used to build the plasma actuator into the surface or for applying on an existing surface. The plasma actuator can be applied to the surface by adhesive attachment, bonding and the like. Plasma actuators, which are mounted flush are preferably mounted in a recess built into the surface to which it is applied. Preferably, the plasma actuator is flush or nearly flush with the surface to which it has been installed thereby creating a smooth surface with no boundary layer tripping effects on the missile, aircraft, munition or ground vehicle during operation.

In measuring or estimating the velocity of fluid flowing past the surface, any technique known to those skilled in the art can be used. The velocity of a fluid flowing over surface can be measured by a number of different types of sensors. These sensors include but are not limited to dynamic pressure sensors (fast-response sensors), pitot static tubes, laser Doppler anemometry, particle image velocimetry, a speedometer, and hot wire and hot film anemometry. These sensors generally give off an electronic signal that can be read or feed into a controller. In addition, the velocity can be estimated or calculated by a number of techniques known to those skilled in the art using indirect information from the aircraft, missile, munition or ground vehicle such as for example engine speed, telemetry, and the like. Preferably, the velocity of the fluid is measured as close to the plasma actuator as possible to most accurately help in determining the actuation characteristics of the plasma actuator. More preferably, at least one sensor is used to measure velocity. Preferably, the sensor used is located within 24 cm from the plasma actuator, more preferably under 12 cm and most preferably under 6 cm.

The power source for the plasma actuators is direct current (DC). The plasma actuators in the specific embodiments within this application preferably use ±24 volts DC. The power required for these embodiments is generally 150% of the power applied to the actuator itself. Any type of power available can be converted to direct current and for these specific embodiments is preferably +24 volts DC. The efficiency of commercial off-the-shelf converters can range from 80% to as high as 96%. These can be AC-to-DC type or DC-to-DC type converters depending on what source of power is being used. Ordinary household AC power for instance can be converted to ±24 volts DC. The same can be said for 12 volts DC which is available in most ground vehicles.

Power levels applied to an actuator are dependent on the application of the actuator and whether the actuator is being operated in the steady or unsteady mode. In the steady mode, the actuator is continuously on and in the unsteady mode the actuator is switched on and off at a particular modulation/pulsing frequency, which is set by taking the velocity in meters/second and dividing this by the placement distance in meters of the plasma actuator or by the extent of flow separation. Effective results in "steady operation" can be achieved using 40-watts per linear foot of actuator. This is assuming 100% duty cycle operation. If the actuator is cycled on and off, the on time can be as low as 10% of the total time where as the off time is 90%. At a 10% duty cycle, the total power consumed by an actuator running 40-watts per linear foot is only 4-watts per linear foot. Effective results, thus, in the "unsteady operation" can be achieved using only 4-watts per linear foot of actuator.

The carrier frequency applied to an actuator is dependent on the construction of the actuator. The frequency can range from 10 kHz to 65 kHz and be in the form of a sine wave, square wave, triangle waves or sawtooth wave. The amplitude of the voltage applied to an actuator is dependent on the construction of the actuator. The voltage is typically expressed in volts peak to peak, and can range from 4 KVpp to 20 KVpp. The modulation frequency of the actuator is dependent on the flow speed and the extent of flow separation (as discussed before).

The plasma actuator is activated at an unsteady actuator frequency that is determined based in part on the velocity of the fluid flowing past the surface of the missile, aircraft, munition or ground vehicle and in part on the placement distance of the actuator. By unsteady frequency, we mean modulation/pulsing frequency which indicates the frequency of the actuator when operating in an unsteady mode. Preferably, the plasma actuator is activated at a frequency that is proportionally based on the velocity of the fluid divided by the placement distance of the plasma actuator. Alternatively, the plasma actuator may be activated at a frequency that is based on the velocity of the fluid divided by the length of a separation bubble (or extent of flow separation). A separation bubble or the extent of flow separation can be measured or estimated. Preferably, the length of the separation bubble or extent of flow separation is measured using two or more sensors placed across the surface to determine the length or extent of flow separation across that surface. More preferably, the plasma actuator is activated at an unsteady actuator frequency that is between about 0.6 to about 1.4 times the velocity of the fluid divided by the placement distance of the plasma actuator from the trailing edge or aft end, or the extent of flow separation. Even more preferably, the plasma actuator is activated at an unsteady actuator frequency that is between about 0.8 to about 1.3 times the velocity of the fluid divided by the placement distance of the plasma actuator from the trailing edge or aft end, or the extent of flow separation. Most preferably, the plasma actuator is activated at an unsteady actuator frequency that is between about 0.85 to about 1.1 times the velocity of the fluid divided by the placement distance of the plasma actuator from the trailing edge or aft end, or the extent of flow separation.

The method of the present invention can be performed manually, using an open-loop control system, a partially closed-loop control system or a closed-loop control system. Preferably, a partially or fully closed-loop control system is used. The closed-loop control system of the present invention not only optionally receives input in part from the sensors, but also can be set up to receive input from a number of other sources. These sources can include but are not limited to the autopilot, crash avoidance, or steering systems on an aircraft; or similar systems or non-integral, non-internal command control systems used to re-program a missile in flight. The missile, aircraft, munition or ground vehicle can be maneuvered or stabilized using this method and a flow control system based in part on the sensors input and in part (if necessary) on new input from for example the autopilot into the closed-loop control system to activate or deactivate the flow effectors as required, or in part manually.

Certain embodiments for example would connect the pressure sensor(s) (or other sensors) to a controller. The controller can be for example a proportional-integral-derivative (PID) controller, an adaptive predictive controller, or an adaptive predictive feedback controller. The controller of the present invention is preferably a closed-loop control system. The controller can be used re-establish laminar flow, to create lift or to create side forces on missile, aircraft, munition or ground vehicle's control surface. The pressure sensor transmits a signal to the controller through the electrical connection (in practical application, multiple pressure sensors send multiple signals to the controller). The controller processes the signals to determine, through mathematical modeling, the dynamics of the flow surface. Such dynamics include but are not limited boundary layer separation and stall. It is the predictive ability of the controller, which provides for this function and expands this system from being merely responsive. This is especially advantageous for dynamic systems, which are nonlinear and time varying and operating in challenging environments. The controller produces an output signal to a monitor, recorder, alarm and/or any peripheral device for alarming, monitoring, or in some manner, affecting or precluding the dynamics upon its incipience. Advantageously, the controller is the ORICA™ controller, an extended horizon, adaptive, predictive controller, produced by Orbital Research, Inc. and patented under U.S. Pat. No. 5,424,942, which is incorporated herein by reference. Under certain conditions, the controller which is connected via electrical connection to the plasma actuator (or to a switch connected to the plasma actuator's power source) causing the actuator to activate.

Optionally a sensor is located or positioned to detect or predict flow separation or conditions of the fluid near the plasma actuator. The sensor(s) of the present invention include but are not limited to a dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the missile or aircraft, which may function as a trigger point for actuating the plasma actuator. The sensors of the present invention are used to determine or estimate flow separation. An inertial measurement unit for example is a sensor, which would not directly measure forces or flow separation, but could be used to estimate or predict separation. The preferred sensor of the present invention is a pressure sensor. The pressure sensor is used to predict or sense flow separation. The pressure sensor can be any type of sensor suitable for measuring the pressure at the flow surface. The pressure sensor can for example be a piezoelectric device, which generates an electric signal in response to a sensed pressure, a shape memory alloy device, or any other pressure sensor or transducer known to those skilled in the art. The pressure sensor can be any pressure sensor but advantageously is a microelectromechanical (MEMS) based or piezoelectric based sensor. MEMS devices are small mechanical/electrical systems that perform small-scale tasks that provide large-scale effects. MEMS devices are generally manufactured using batch microfabrication technology, the same manufacturing technology used to make integrated circuits (IC's). Consequently, many of the same benefits of IC manufacturing are applicable to MEMS manufacturing including high reliability, high yield, and low cost. Furthermore, since IC's and MEMS are both silicon-based technologies and are fabricated using similar techniques, it is relatively easy to merge microelectronics and micromechanical elements onto the same substrates. Electrostatic actuated MEMS devices have two dominating advantages as compared to other actuation mechanisms, which are high bandwidth and low power consumption.

The sensor transmits a signal, in this case a voltage but it is understood to one skilled in the art that the signal can be other than voltage, including, but not limited to, current, pressure, hydraulic or optical. The signal corresponds to the pressure it senses. Preferably, the ratio of flow effectors to sensors is less than about 100:1, more preferably less than or equal to about 50:1, still preferably less than or equal to about 20:1, even more preferably less than or equal to about 3:1, still even more preferably less than or equal to about 2:1, and most preferably less than or equal to 1:1. The higher the concentration of sensors and more preferably pressure sensors to flow effectors the more redundancy can be built into the system utilizing the present invention. Most preferably the sensor is a flush, surface mounted diaphragm type pressure sensor producing an electrical signal that can be used in a readout or sent to a controller.

Optionally, certain embodiments of the present invention include the step of estimating or determining a time of flow separation of the fluid from the surface near the location of the plasma actuator. Flow separation or surface conditions can be estimated or determined using the sensors listed above.

Referring now to FIG. 1, there is shown a schematic view of a ground vehicle 10 showing the placement or location of one or more plasma actuator(s) 12. The ground vehicle's surface or control surface 18 in this particular embodiment is a spoiler 16, however, the plasma actuators can also be placed or located on any other surface 18 on the ground vehicle 10. Also placed or located on the spoiler 16 in FIG. 1 are sensors 14 positioned to detect or predict flow separation near the location of the plasma actuator 12.

Figure 2:
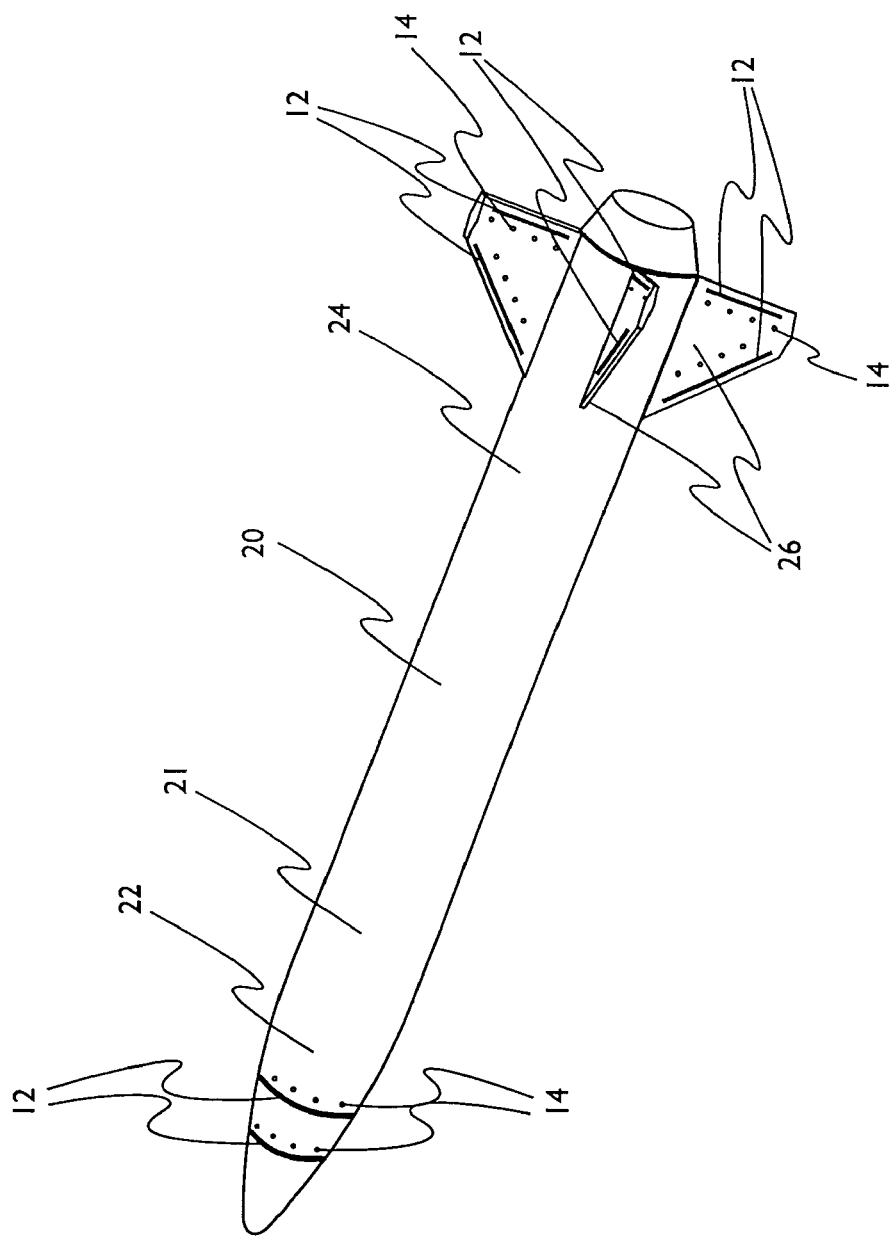
FIG. 2. Schematic view of a missile depicting the placement or location of one or more plasma actuator(s) on both the missiles body and control surfaces or fins.

FIG. 2 is a schematic view of a missile 20 showing the placement or location of one or more plasma actuator(s) 12 on both the missiles body 21 and control surfaces or fins 26. The missile 20 has a forebody 22 and afterbody 24. In this particular embodiment, plasma actuators 12 are located or placed on the missile's forebody 22 and on the fins 26 located on the missile's afterbody 24. Also placed or located on the missile's forebody 22 and on the fins of the missile's afterbody 24 are sensors 14 positioned to detect or predict flow separation near the location of the plasma actuator. The sensors in this embodiment are pressure sensors 14 having an electrical signal which is used to determine or estimate a time of flow separation of the fluid from the surface near the location of the plasma actuator.

Figure 3:
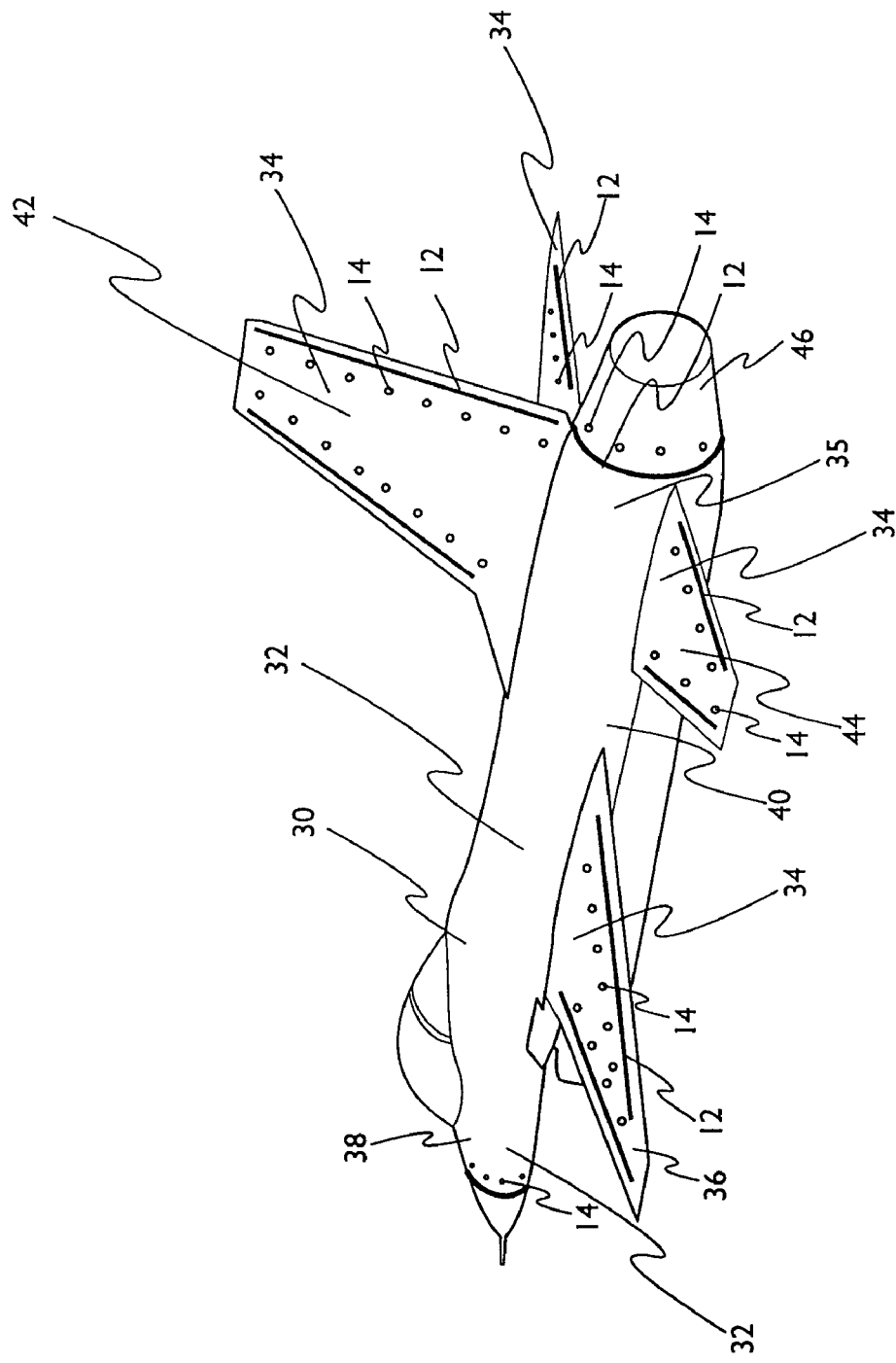
FIG. 3. Schematic view of an airplane depicting the placement or location of one or more plasma actuator(s) on both the airplane's body or fuselage, and lifting and control surfaces.

FIG. 3 is a schematic view of an airplane 30 showing the placement or location of one or more plasma actuator(s) 12 on both the airplane's body or fuselage 32 and control surfaces 34. The airplane can be any type of aircraft, including commercial, and military. The airplane or aircraft 20 includes a fuselage 32, a tail 35, wings 36, forebody (nose) 38, afterbody 40, a rudder 42, fins 44 and boattail 46. In this specific embodiment, the plasma actuators 12 and individual sensors 14 are also mounted in close proximity with respect to each other on the airplane's nose 38, wings 36, rudder 42, fins 44 and boattail 46.

Figure 4:
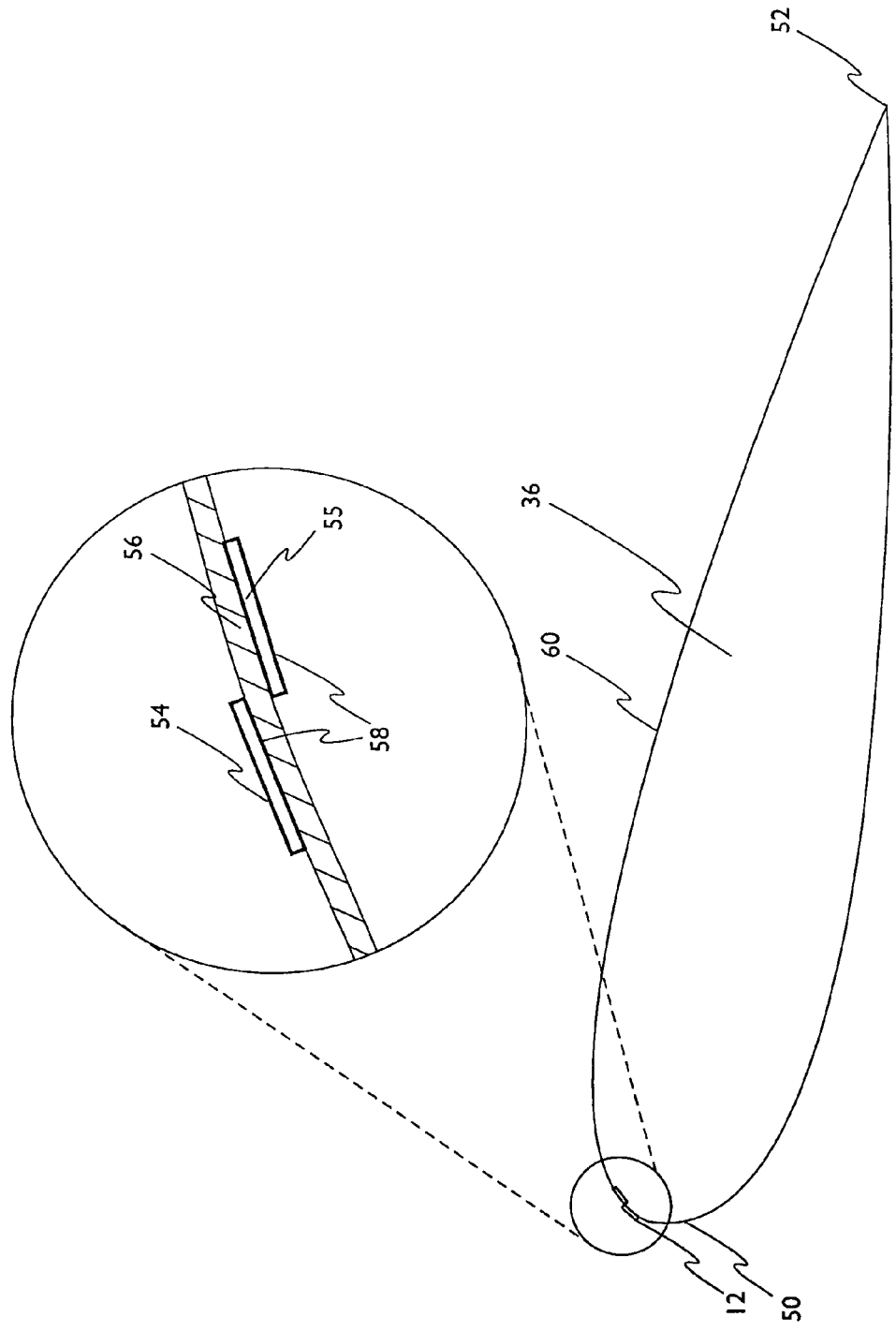
FIG. 4. Cross-sectional view of a wing of an airplane with one plasma actuator being located or placed near the leading edge of the wing.

FIG. 4 is a cross-sectional view of a wing 36 of an airplane with one plasma actuator 12 being located or placed on the leading edge 50 of the wing 36. The plasma actuator 12 used is a dielectric-barrier-discharge or surface discharge plasma actuator. This particular actuator consists of two electrodes 54, 55 separated by a dielectric material 56. The bottom surface 58 of the plasma actuator being attached or bonded to the surface 60 of the wing 36. The dielectric material 56 isolating or encapsulating the second electrode 55 from the fluid (not shown) passing over the control surface or wing 36 and from the first electrode 54. The dielectric material 56 for this particular actuator is a Kapton film. The method of the present invention activates and deactivates the plasma actuator 12 at a frequency based on the velocity of the fluid passing over the control surface or wing 36 as in this case divided by the placement distance of the plasma actuator from the trailing edge or aft end 52 of the surface, or the extent of flow separation.

Figure 5:
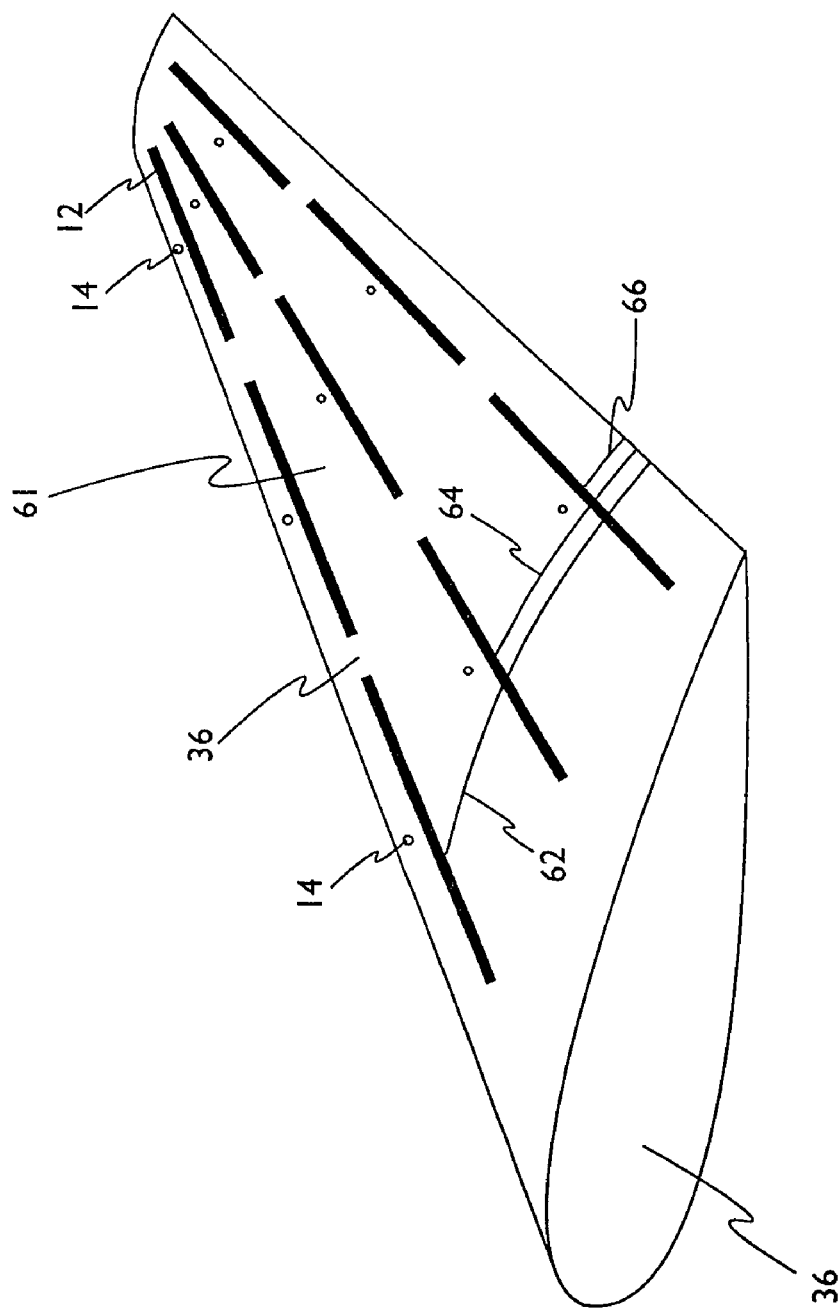
FIG. 5. Schematic view of a wing of an airplane with numerous plasma actuators being located or placed at various locations across the upper surface of the wing.

FIG. 5 is a schematic view of a wing 36 of an airplane with nine plasma actuators 12 being located or placed at various locations across the upper surface 60 of the wing 36. Also placed or located on the airplane's wing 36 are nine sensors 14 positioned or located to detect or predict flow separation near the location of the plasma actuator. The surface 61 depicts the cross-section of the wing 36 at or near where the wing attaches to the fuselage (not shown) of the airplane depicted in FIG. 3. The placement distances, also referred to as the extent of flow separation, 62, 64, 66, of the three plasma actuators nearest the fuselage of the airplane are represented by the three lines along the upper surface 61 of the wing 36.

Figure 6:
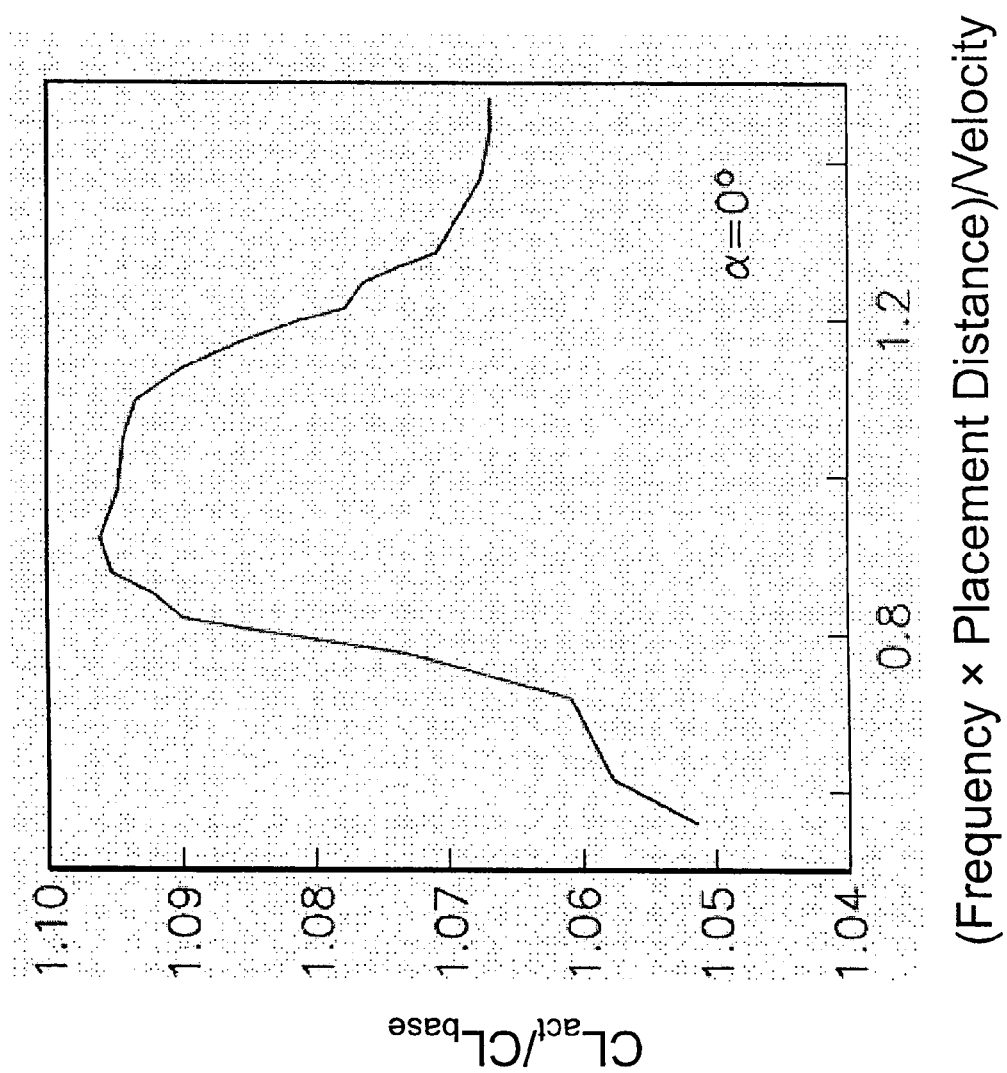
FIG. 6. Schematic view of a wing of an airplane with numerous plasma actuators being located or placed at various locations across the lower surface of the wing.

FIG. 6 is a schematic view of a wing 36 of an airplane with six plasma actuators 12 being located or placed at various locations across the lower surface 72 of the wing 36. In this embodiment, near the trailing edge of the wing. Also placed or located on the airplane's wing 36 are six sensors 14 positioned or located to detect or predict flow separation near the location of the plasma actuator. The surface 72 depicts the cross-section of the wing 36 at or near where the wing attaches to the fuselage (not shown) of the airplane depicted in FIG. 3. The placement distances, also referred to as the extent of flow separation, 74, 76, of the three plasma actuators nearest the fuselage of the airplane are represented by the two lines along the lower surface 72 of the wing 36.

Figure 7:
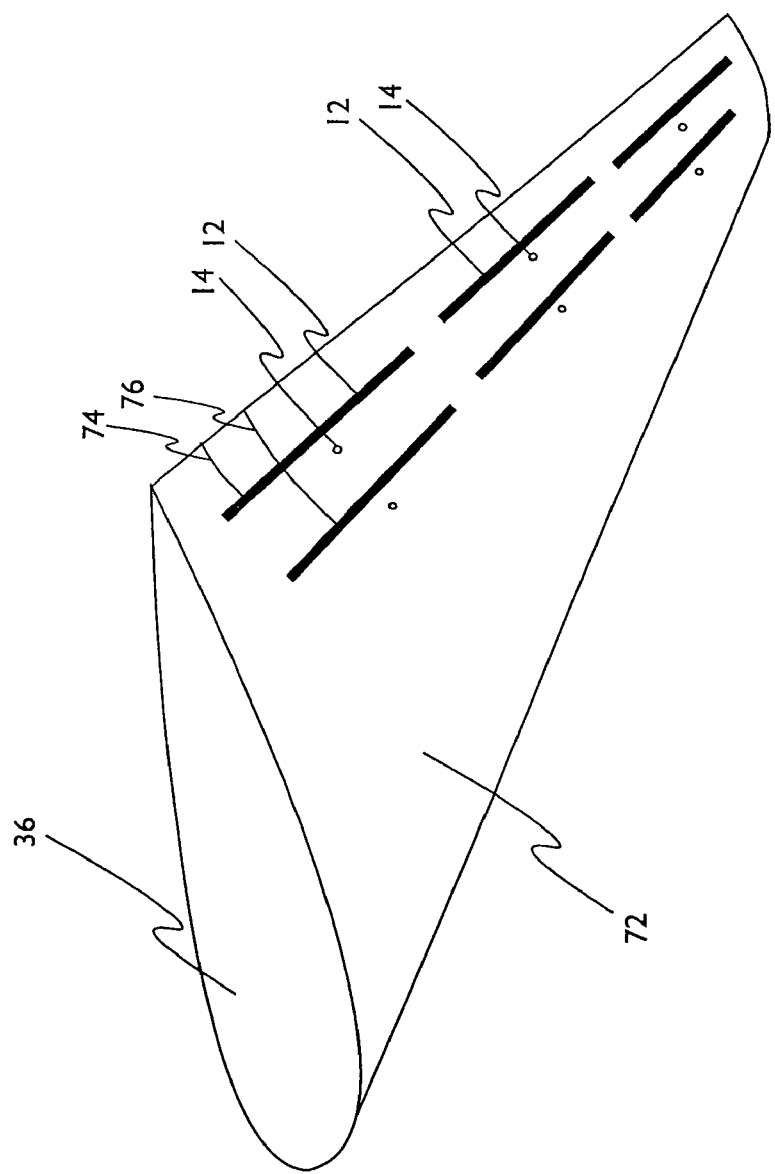
FIG. 7. Graph showing data from a test of a control surface with a plasma actuator.

FIG. 7 is a graph showing actual data from a test of a control surface with a plasma actuator. The graph is of plot of actual data showing the normalized lift coefficient versus the activation of the plasma actuator at a frequency equal to between about 0.6 to about 1.4 times the velocity of the fluid flowing over the surface divided by the actuation distance of the actuator. The plot shows that the optimal and unexpected improvement in lift enhancement is highest when operated between 0.6 and 1.4, which corresponds to the desired operating unsteady frequency.

Figure 8:
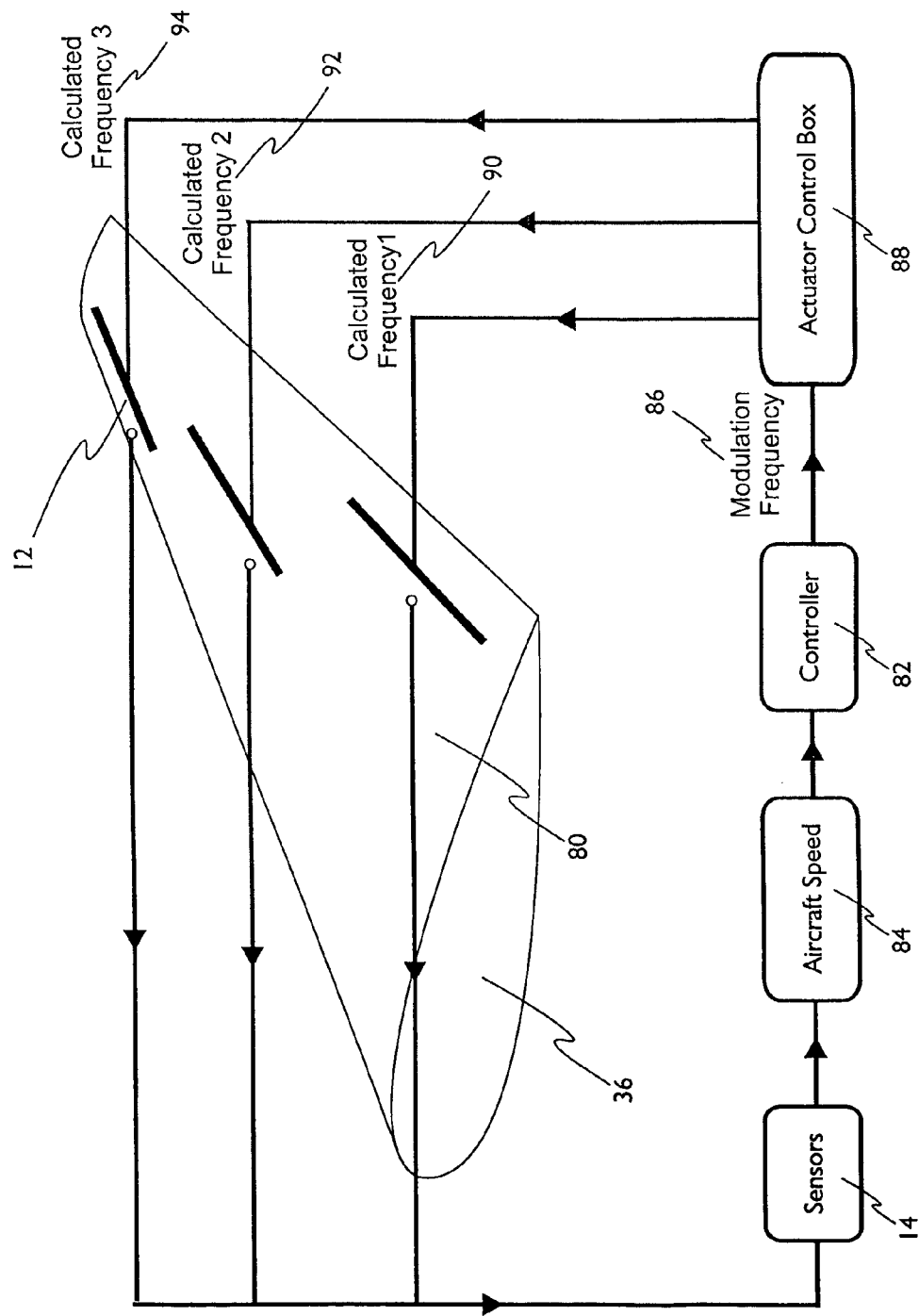
FIG. 8. Flow diagram showing one embodiment of the method of the present invention.

FIG. 8 is a schematic/flow diagram showing one embodiment of the method of the present invention. This schematic depicts the sensors on the control surface 80 of a wing 36. The signal from the sensor(s) 14 are fed into the controller in part to determine or estimate when the plasma actuator(s) 12 are to be actuated. The controller 82 also predicts or estimates the fluid velocity 84 at or near the plasma actuator(s) 12 in order to set the modulation frequency 86 of the plasma actuator(s) 12. In this embodiment, an actuator control box 88 calculates frequencies 90, 92, 94 for three separate plasma actuators and activates and deactivates the actuators 12.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A method of controlling flow of fluid across a surface of a missile, aircraft, munition, or ground vehicle having a number of surfaces comprising the steps of:
    locating a plasma actuator on or essentially flush with a surface of the missile, aircraft, munition or ground vehicle having a trailing edge or aft end, a placement distance from the trailing edge or aft end;
    measuring or estimating a velocity of a fluid flowing past the surface of the missile, aircraft, munition or ground vehicle; and
    activating the plasma actuator at a frequency equal to between about 0.6 to about 1.4 times the velocity of the fluid divided by the placement distance of the plasma actuator from the trailing edge or aft end, or the extent of flow separation.

2. The method in claim 1, wherein the plasma actuator is a dielectric-barrier-discharge plasma actuator.

3. The method in claim 2, wherein the plasma actuator is used to increase lift at angles of attack from about 0 through 10 degrees.

4. The method in claim 2, wherein the plasma actuator is activated and deactivated by a closed loop control system.

5. The method in claim 2, wherein the method is used to assist in stabilizing, controlling, or improving the performance of a race car.

6. The method in claim 2, wherein the method is used to assist in stabilizing or controlling munitions.

7. The method in claim 2, wherein the method is used to assist in stabilizing or controlling missiles.

8. A method of controlling flow of fluid across a surface of a missile, aircraft, munition, or ground vehicle having a number of surfaces comprising the steps of:
    locating a plasma actuator on or essentially flush with a surface of the missile, aircraft, munition or ground vehicle having a trailing edge or aft end, a placement distance from the trailing edge or aft end;
    measuring or estimating a velocity of a fluid flowing past the surface of the missile, aircraft, munition or ground vehicle;
    determining or estimating a time of flow separation of the fluid from the surface near the location of the plasma actuator; and
    activating the plasma actuator near the time of flow separation of the fluid at a frequency equal to between about 0.6 to about 1.4 times the velocity of the fluid divided by the placement distance of the plasma actuator from the trailing edge or aft end.

9. The method in claim 8, wherein the plasma actuator is a dielectric-barrier-discharge plasma actuator.

10. The method in claim 9, wherein the plasma actuator is activated and deactivated by a closed loop control system.

11. The method in claim 9, wherein the method is used to assist in stabilizing or controlling a race car.

12. The method in claim 9, wherein the method is used to assist in stabilizing or controlling munitions.

13. The method in claim 9, wherein the method is used to assist in stabilizing or controlling missiles.

14. A method of controlling flow of fluid across a surface of a missile, aircraft, munition, or ground vehicle having a number of surfaces comprising the steps of:
    locating a plasma actuator on or essentially flush with a surface of the missile, aircraft, munition or ground vehicle having a trailing edge or aft end, a placement distance from the trailing edge or aft end;
    locating a sensor having a signal, the sensor being positioned to detect or predict flow separation of a fluid near the location of the plasma actuator;
    measuring or estimating a velocity of a fluid flowing past the surface of the missile, aircraft, munition or ground vehicle;
    determining or estimating a time of the flow separation of the fluid from the surface near the location of the plasma actuator based at least in part on the signal of the sensor; and
    activating and deactivating the plasma actuator near the time of flow separation of the fluid at a frequency equal to between about 0.6 to about 1.4 times the velocity of the fluid divided by the placement distance of the plasma actuator from the trailing edge or aft end, or the extent of flow separation.

15. The method in claim 14, wherein the plasma actuator is a dielectric-barrier-discharge plasma actuator.

16. The method in claim 15, wherein the plasma actuator is activated and deactivated by a closed loop control system.

17. The method in claim 15, wherein the method is used to assist in stabilizing or controlling a race car.

18. The method in claim 15, wherein the method is used to assist in stabilizing or controlling munitions.

19. The method in claim 15, wherein the method is used to assist in stabilizing or controlling missiles.

20. The method in claim 15, wherein the method is used to assist in stabilizing or controlling aircraft.

* * * * *